United States Patent
Saegusa et al.

(10) Patent No.: US 9,688,140 B2
(45) Date of Patent: Jun. 27, 2017

(54) DRIVE FORCE DISTRIBUTION DEVICE FOR AUTOMOBILE

(71) Applicant: HONDA MOTOR CO., LTD., Tokyo (JP)

(72) Inventors: Daiki Saegusa, Wako (JP); Sachi Fujinuma, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/917,365

(22) PCT Filed: Dec. 15, 2014

(86) PCT No.: PCT/JP2014/083106
§ 371 (c)(1),
(2) Date: Mar. 8, 2016

(87) PCT Pub. No.: WO2015/125390
PCT Pub. Date: Aug. 27, 2015

(65) Prior Publication Data
US 2016/0355088 A1 Dec. 8, 2016

(30) Foreign Application Priority Data
Feb. 19, 2014 (JP) .................................. 2014-029820

(51) Int. Cl.
*F16D 25/08* (2006.01)
*B60K 17/16* (2006.01)
(Continued)

(52) U.S. Cl.
CPC .......... *B60K 17/165* (2013.01); *B60K 17/348* (2013.01); *F16D 13/52* (2013.01);
(Continued)

(58) Field of Classification Search
CPC ..... B60K 17/165; B60K 17/348; F16D 13/52; F16D 21/00; F16D 25/06; F16H 48/32; F16H 48/22; F16H 48/19
See application file for complete search history.

(56) References Cited

U.S. PATENT DOCUMENTS 5,680,919 A * 10/1997 Sekiguchi ............... F16D 25/06
192/106 F
5,964,126 A * 10/1999 Okcuoglu .......... B60K 17/3505
74/650
(Continued)

FOREIGN PATENT DOCUMENTS

JP    2-135760 U     11/1990
JP    2010-96198 A   4/2010
(Continued)

OTHER PUBLICATIONS

International Search Report dated Mar. 17, 2015, issued in counterpart Application No. PCT/JP2014/083106 (2 pages).

*Primary Examiner* — David J Hlavka
(74) *Attorney, Agent, or Firm* — Westerman, Hattori, Daniels & Adrian, LLP

(57) ABSTRACT

A drive force distribution device for an automobile is provided in which a hydraulic clutch includes an annular oil groove opposing a clutch piston in an inner wall face of a clutch oil chamber, and a hydraulic oil supply port and a hydraulic oil discharge port communicating with the oil groove. Since when the hydraulic oil supply port of the oil groove is a starting end and the hydraulic oil discharge port of the oil groove is a finishing end, a cross-sectional area of a longer oil groove section of the annular oil groove is set to be larger than a cross-sectional area of a shorter oil groove section, the flow path resistance of the oil groove sect of the respective hydraulic clutches made to be uniform. This enables smooth operation, improvement of the engagement (Continued)

responsiveness and uniformization of the engagement responsiveness of the hydraulic clutches to be achieved.

2 Claims, 3 Drawing Sheets

(51) Int. Cl.
  F16D 25/12 (2006.01)
  F16H 48/22 (2006.01)
  B60K 17/348 (2006.01)
  F16D 13/52 (2006.01)
  F16D 21/00 (2006.01)
  F16D 25/06 (2006.01)
  F16H 48/19 (2012.01)
  F16H 48/32 (2012.01)
  F16H 48/34 (2012.01)

(52) U.S. Cl.
  CPC ............ *F16D 21/00* (2013.01); *F16D 25/06* (2013.01); *F16D 25/12* (2013.01); *F16H 48/19* (2013.01); *F16H 48/22* (2013.01); *F16H 48/32* (2013.01); *F16H 2048/343* (2013.01)

(56) References Cited

U.S. PATENT DOCUMENTS

| 6,681,913 B2* | 1/2004 | Lee | B60K 17/3505 |
| | | | 192/103 F |
| 2002/0019284 A1* | 2/2002 | Aikawa | B60K 1/00 |
| | | | 475/150 |
| 2002/0125097 A1* | 9/2002 | Ochab | B60K 17/3515 |
| | | | 192/38 |
| 2007/0135254 A1* | 6/2007 | Okazaki | F16H 48/08 |
| | | | 475/160 |

FOREIGN PATENT DOCUMENTS

| JP | 2010-164102 A | 7/2010 |
| JP | 2010-190284 A | 9/2010 |
| JP | 2011-149516 A | 8/2011 |

* cited by examiner

FIG.3
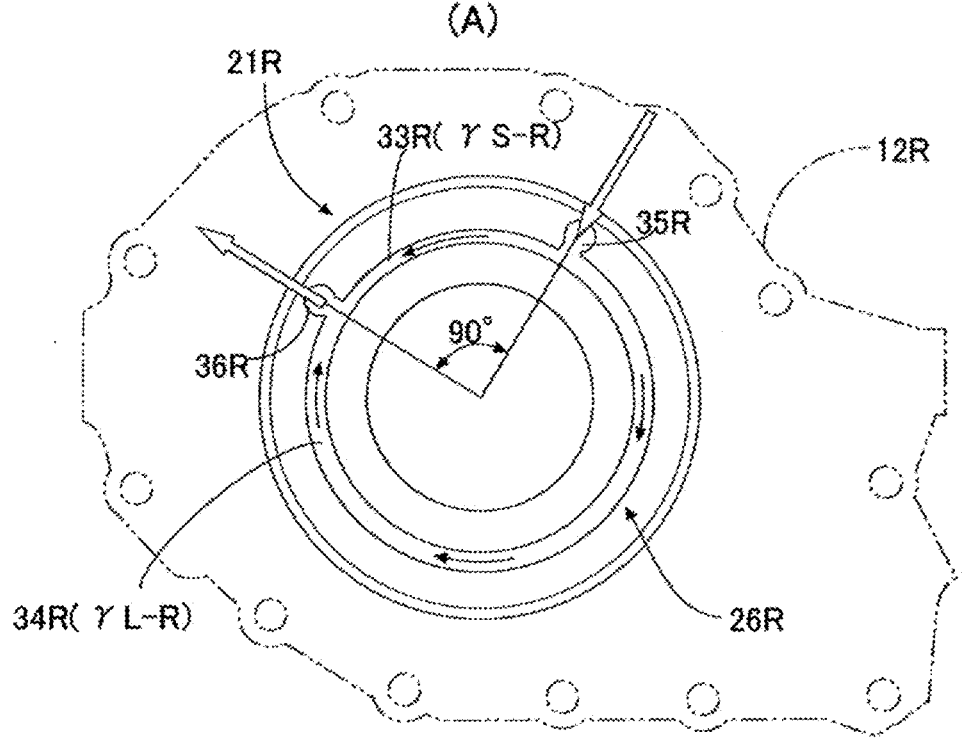
(A)
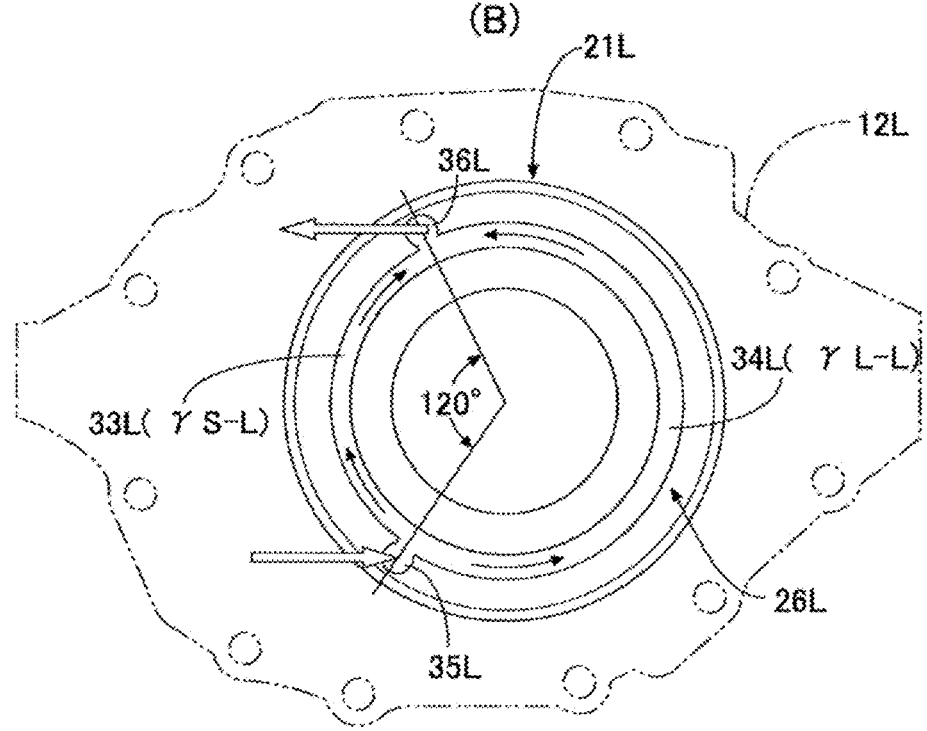
(B)

DRIVE FORCE DISTRIBUTION DEVICE FOR AUTOMOBILE

TECHNICAL FIELD

The present invention relates to a drive force distribution device for an automobile, the device including left and right hydraulic clutches for transmitting a driving force of a drive source to left and right axles, the hydraulic clutch including an annular oil groove opposing a clutch piston in an inner wall face of an oil chamber, and a hydraulic oil supply port and a hydraulic oil discharge port communicating with the oil groove.

BACKGROUND ART

An arrangement in which a pair of left and right hydraulic clutches are provided on a rear differential gear of a four-wheel drive vehicle, and the driving force transmitted from a transfer case of a transmission via a propeller shaft is distributed between left and right rear wheels at any ratio via the pair of left and right hydraulic clutches is known from Patent Document 1 below.

RELATED ART DOCUMENTS

Patent Documents

Patent Document 1: Japanese Patent Application Laid-open No. 2010-96198

SUMMARY OF THE INVENTION

Problems to be Solved by the Invention

When the arrangement is such that an annular oil groove having a hydraulic oil supply port and a hydraulic oil discharge port is formed in an inner wall face of a piston oil chamber of a hydraulic clutch of a rear differential gear, and hydraulic oil supplied from the hydraulic oil supply port to the oil groove is discharged from the hydraulic oil discharge port so as to drive a clutch piston, due to the requirements in terms of layout the hydraulic oil supply port and the hydraulic oil discharge port of the left and right hydraulic clutches sometimes cannot be formed at symmetrical positions on the left and right. That is, although the ideal positions for the hydraulic oil supply port and the hydraulic oil discharge port are at opposite ends in the diameter direction of the annular oil groove (phase difference 180°), it sometimes happens that the phase difference of the right hydraulic clutch is for example and the phase difference of the left hydraulic clutch is 120°.

In this way, if the phase difference between the hydraulic oil supply port and the hydraulic oil discharge port of the annular oil groove deviates from 180°, hydraulic oil that has supplied from the hydraulic Oil supply port is discharged to the hydraulic oil discharge port through the annular oil groove while being divided in the form of a bifurcated flow path, since the resistance of hydraulic oil is low for the shorter flow path and the resistance of hydraulic oil is high for the longer flow path, the hydraulic oil is short-circuited along the shorter flow path, thereby making it impossible to press the whole clutch piston evenly, and there is a possibility that smooth engagement of the hydraulic clutch will be inhibited. Moreover, since the time taken for filling the clutch oil chamber with hydraulic oil varies depending on the magnitude of the flow path resistance, there is a possibility that variation in the engagement responsiveness of the hydraulic clutch will occur.

The present invention has been accomplished in light of the above circumstances, and it is an object thereof to enable smooth operation of left and right hydraulic clutches of a drive force distribution device for an automobile, and to eliminate variation in the engagement responsiveness.

Means for Solving the Problems

In order to attain the above object, according to a first aspect of the present invention, there is provided a drive force distribution device for an automobile, comprising left and right hydraulic clutches for transmitting a driving force of a drive source to left and right axles, the hydraulic clutch comprising an annular oil groove opposing a clutch piston in an inner wall face of a clutch oil chamber, and a hydraulic oil supply port and a hydraulic oil discharge port communicating with the annular oil groove, wherein the annular oil groove is formed of a shorter oil groove section and a longer oil groove section and, if the hydraulic oil supply port of the annular oil groove is a starting end of the oil groove sections and the hydraulic oil discharge port of the annular oil groove is a finishing end of the oil groove sections, a cross-sectional area of the longer oil groove section is set to be larger than a cross-sectional area of the shorter oil groove section. Further, according to a second aspect of the present invention, in addition to the first aspect, a relative positional relationship of the hydraulic oil supply port and the hydraulic oil discharge port is set to be different between the left and right hydraulic clutches, and, of the cross-sectional areas of the shorter oil groove sections of the left and right hydraulic oil clutches, the cross-sectional area of a longer one of the shorter oil groove sections is set to be larger than the cross-sectional area of a shorter one of the shorter oil groove sections.

Effects of the Invention

In accordance with the first aspect of the present invention, the left and right hydraulic clutches for transmitting the driving force of the drive source to left and right axles each include the annular oil groove opposing the clutch piston on the inner wall face of the oil chamber, and the hydraulic oil supply port and the hydraulic oil discharge port communicating with the oil groove. The positions of the hydraulic oil supply port and the hydraulic oil discharge port are different for the left and right hydraulic clutches, however, since when the hydraulic oil supply port of the annular oil groove is a starting end and the hydraulic oil discharge port of the oil groove is a finishing end. a cross-sectional area of the longer oil groove section is set to be larger than a cross-sectional area of the shorter oil groove section, it is possible to make the flow path resistance of the oil groove sections having different lengths between the hydraulic oil supply ports and the hydraulic oil discharge ports of the respective hydraulic clutches uniform, thus making smooth operation possible by enabling the whole clutch piston to be pressed without bias and reducing pressure loss of the oil pressure and, moreover, it is possible to achieve improvement of the engagement responsiveness of the left and right hydraulic clutches and make the engagement responsiveness uniform.

BRIEF DESCRIPTION OF DRAWINGS

FIG. 3 is a sectional view along line 3A-3A and 3B-3B in FIG. 1. (first embodiment)

EXPLANATION OF REFERENCE NUMERALS AND SYMBOLS

19R Axle
19L Axle
21R Hydraulic clutch
71L Hydraulic clutch
25R Clutch piston
25L Clutch piston
26R Clutch oil chamber
26L Clutch oil chamber
33R Oil groove
33L Oil groove
34R Oil groove
34L Oil groove
35R Hydraulic Oil supply port
35L Hydraulic oil supply port
36R Hydraulic oil discharge port
36L Hydraulic oil discharge port

MODE FOR CARRYING OUT THE INVENTION

An embodiment of the present invention is explained below by reference to FIG. 1 to FIG. 3.

First Embodiment

Figure 1:
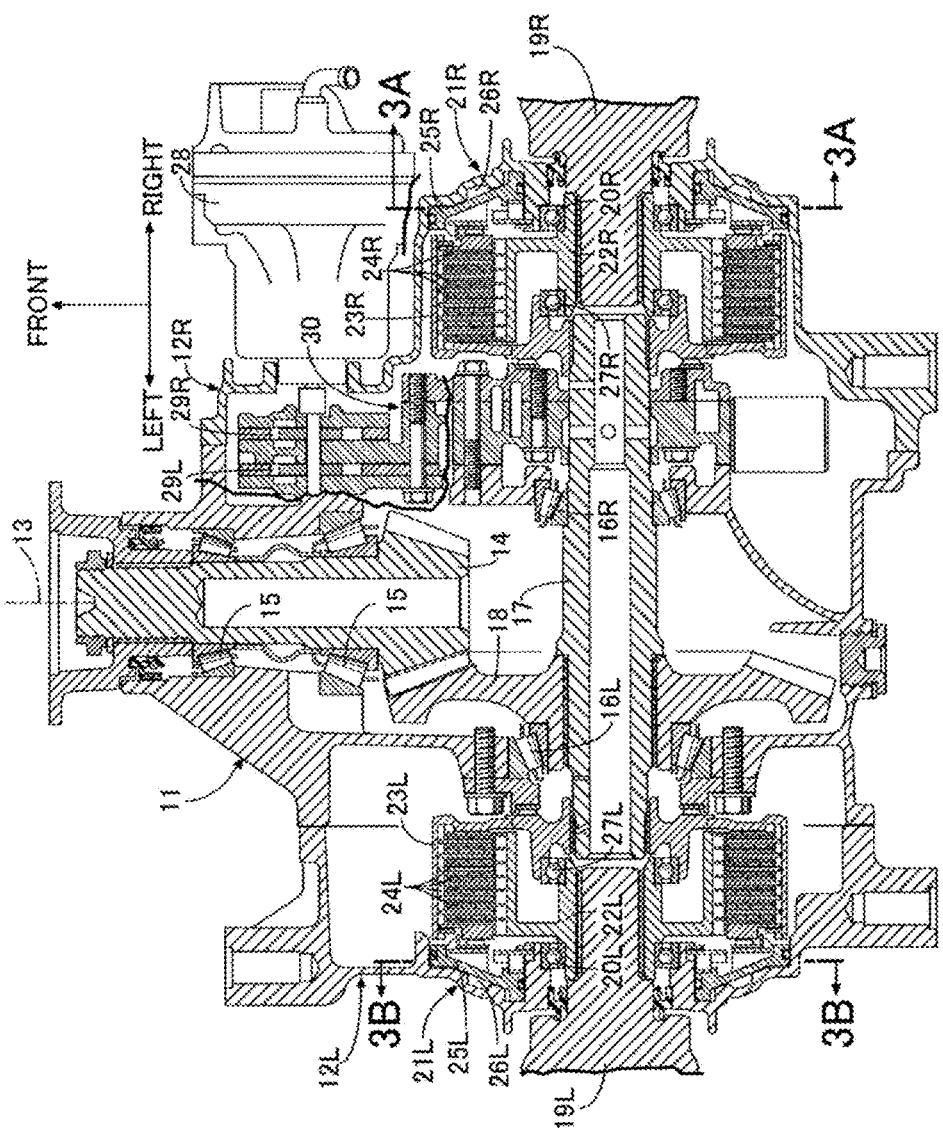
FIG. 1 is a vertical sectional view of as drive force distribution device for an automobile. (first embodiment)

As shown in FIG. 1, a drive force distribution device for distributing driving force between left and right rear wheels of a four-wheel drive vehicle includes a Middle casing 11, a right casing 12R joined to a right side face of the middle casing 11, and a left casing 12L joined to a left side face of the middle casing 11. Supported on the middle casing 11 via a pair of front and rear roller bearings 15 and 15 is a drive bevel gear 14 connected to the rear end of a propeller shaft 13 extending to the rear from a transmission transfer case, which is not illustrated, the drive bevel gear 14 meshing with a driven bevel gear 18 fixedly provided on a clutch input shaft 17 supported on the middle casing 11 via a pair of left and fight roller bearings 16R and 16L.

Supported on the right casing 12R via a ball bearing 20R is a right axle 19R connected to a right rear wheel, and disposed between the right end of the clutch input shaft 17 and the left end of the right axle 19R is a right hydraulic clutch 21R. Similarly, supported on the left casing 12L via a ball bearing 20L is a left axle 19L connected to a left rear wheel, and disposed between the left end of the clutch input shaft 17 and the right end of the left axle 19L is a left hydraulic clutch 21L.

The right hydraulic clutch 21R includes a clutch inner 22R spline joined to the right axle 19R, a clutch outer 23R spline joined to the right end of the clutch input shaft 17, a plurality of friction plates 24R disposed between the clutch inner 22R and the clutch outer 23R, a clutch piston 25R slidably fitted into the interior of the right casing 12R and capable of pressing the friction plates 24R leftward, a clutch oil chamber 26R defined between a back face of the clutch piston 25R and an inner face of the right casing 12R, and a ball bearing 27R disposed between the clutch inner 22R and the clutch outer 23R.

The structure of the left hydraulic clutch 21L is bilaterally symmetrical with and substantially the same as the structure of the right hydraulic clutch 21R described above, and duplication of the explanation is omitted. Reference numerals and symbols for components of the left hydraulic clutch 21L are modifications of reference numerals and symbols of the components of the right hydraulic clutch 21R, with the suffix 'L' replacing 'R'.

Disposed on a right end part of the middle casing 11 are a right oil pump 29R and a left oil pump 29L driven by an electric motor 28, and a valve block 30 housing a valve, etc. for controlling the supply of hydraulic oil from the right oil pump 29R and the left oil pump 29L to the right hydraulic clutch 21R and the left hydraulic clutch 21L.

Figure 2:
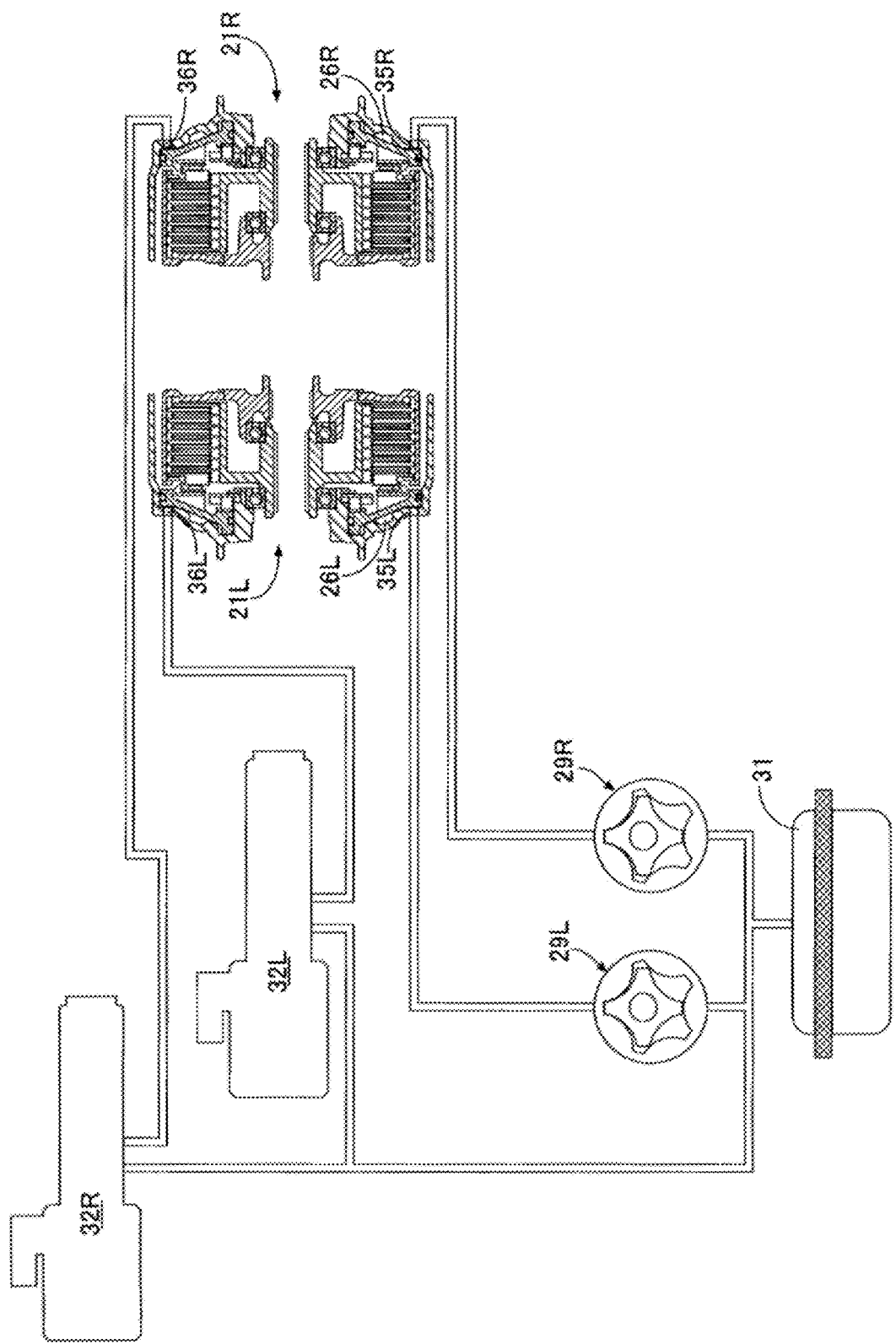
FIG. 2 is as diagram showing a hydraulic circuit for supplying hydraulic oil to a hydraulic clutch. (first embodiment)

As shown in FIG. 2, hydraulic oil that has been pumped up from an oil tank 31 by the right oil pump 29R is supplied to the clutch oil chamber 26R of the right hydraulic clutch 21R, then passes through a right throttle valve 32R, which is a linear solenoid valve, and is returned to the oil tank 31. Hydraulic oil that has been pumped up from the oil tank 31 by the left oil pump 29L is supplied to the clutch oil chamber 26L of the left hydraulic clutch 21L, then passes through a left throttle valve 32L, which is a linear solenoid valve, and is returned to the oil tank 31.

In this process, since when the left and right throttle valves 32R and 32L are in a fully open state the hydraulic oil passes through the clutch oil chambers 26R and 26L and the oil pressure does not rise, engagement of the left and right hydraulic clutches 21R and 21L is released. Furthermore, when the left and right throttle valves 32R and 32L are narrowed, the oil pressure of the clutch oil chambers 26R and 26L rises in response to the degree of opening thereof the left and right hydraulic clutches 21R and 21L are engaged with a predetermined engagement torque, and a given torque can be transmitted from the clutch input shaft 17 to the left and right axles 19R and 19L.

FIG. 3 (A) shows an inner wall face (face opposing the back face of the clutch piston 25R) of the right casing 12R defining the clutch oil chamber 26R of the right hydraulic clutch 21R. Long and short oil grooves 33R and 34R forming an annular shape are formed in the inner wall face of the clutch oil chamber 26R, and when the right hydraulic clutch 21R is disengaged and the clutch piston 25R moves back, an annular oil passage is formed between the inner wall face of the right casing 12R and the back face of the clutch piston 25R by means of the oil grooves 33R and 34R.

Formed at starting ends of the two oil grooves 33R and 34R is a hydraulic oil supply port 35R connected to the right oil pump 29R, and formed at finishing ends of the two oil grooves 33R and 34R is a hydraulic oil discharge port 36R connected to the right throttle valve 32R. In the present embodiment, the phase difference between the hydraulic oil supply port 35R and the hydraulic oil discharge port 36R having the short oil passage 33R of the right hydraulic clutch 21R interposed therebetween is set at 90° for the convenience of space and layout.

FIG. 3 (B) shows an inner wall face (face opposing the back face of the clutch piston 25L) of the left casing 12L defining the clutch oil chamber 26L of the left hydraulic clutch 21L. Long and short oil grooves 33L and 34L forming an annular shape are formed in the inner wall face of the clutch oil chamber 26L, and when the left hydraulic clutch 21L is disengaged and the clutch piston 25L moves back, an annular oil passage is formed between the inner wall face of the left casing 12L and the back face of the clutch piston 25L by means of the oil grooves 33L and 34L.

Formed at starting ends of the two oil grooves 33L and 34L is a hydraulic oil supply port 35L connected to the left oil pump 29L, and formed at finishing ends of the two oil grooves 33L and 34L is a hydraulic oil discharge port 36L connected to the left throttle valve 32L. In the present embodiment, the phase difference between the hydraulic oil supply port 35L and the hydraulic oil discharge port 36L having the short oil passage 33L of the left hydraulic clutch 21L interposed therebetween is set at 120° for the convenience of space and layout.

The short oil groove 33R and the long oil groove 34R of the right hydraulic clutch 21R have different widths; the width of the short oil groove 33R, which has a low flow path resistance due to it being short, is smaller than the width of the long oil groove 34R, which has a high flow path resistance due to it being long. Similarly, the short oil groove 33L and the long oil groove 34L of the left clutch 21L have different widths; the width of the short oil groove 33L, which has a low flow path resistance due to it being short, is smaller than the width of the long oil groove 34L, which has a high flow path resistance due to it being The cross section of the oil passages formed on the back faces of the clutch pistons 25R and 25L by means of the oil grooves 33R, 33L, 34R, and 34L is modeled as a circular cross section; when the radius of the short oil groove 33R and the radius of the long oil groove 34R of the right hydraulic clutch 21R are defined as $\gamma SR$ and $\gamma LR$ respectively, and the radius of the short oil groove 33L and the radius of the long oil groove 34L of the left hydraulic clutch 21L are defined as $\gamma SL$ and $\gamma LL$ respectively, since the requirement is that the flow velocity of hydraulic oil flowing through the short oil groove 33R of the right hydraulic clutch 21R coincides with that of the long oil groove 34R, and the flow rate of hydraulic oil flowing through the short oil groove 33L of the left hydraulic clutch 21L coincides with that of the long oil groove 34L, the relationship between the radius $\gamma SR$ of the short oil groove 33R and the radius $\gamma LR$ of the long oil groove 34R of the right hydraulic clutch 21R is set as follows.

$$\gamma LR/\gamma SR = \sqrt{(NR-1)} \quad (1)$$

Here, NR is the value obtained from $\theta/360 = 1/NR$ where $\theta$ is the phase difference [deg] between the hydraulic oil supply port 35R and the hydraulic oil discharge port 36R. For the right hydraulic clutch 21R of the embodiment, since $\theta = 90°$, NR=4, and the radii are set so that $\gamma LR/\gamma SR = \sqrt{3}$.

Similarly, the relationship between a radius $\gamma SL$ of the short oil groove 33L and a radius $\gamma LL$ of the long oil groove 34L of the left hydraulic clutch 21L is set as follows.

$$\gamma LL/\gamma SL = \sqrt{(NL-1)} \quad (2)$$

For the left hydraulic clutch 21L of the embodiment, since $\theta = 120'$, NL=3, and the radii are set so that $\gamma LL/\gamma SL = \sqrt{2}$.

Furthermore, due to the requirement that the combined flow rate of hydraulic oil of the short oil groove 33R and of the long oil move 34R of the right hydraulic clutch 21R is equal to the combined flow rate of hydraulic oil of the short oil groove 33L and of the long oil groove 34L of the left hydraulic clutch 21L, the radii are set so that.

$$\gamma SL/\gamma SR = \sqrt{(NR/2)}/\sqrt{(NL/2)} \quad (3)$$

For the right hydraulic clutch 21R of the embodiment, NR=4, for the left hydraulic clutch 21L of the embodiment, NL=3, and the radii are therefore set so that $\gamma SL/\gamma SR = \sqrt{2}/\sqrt{1.5}$.

The operation of the embodiment of the present invention having the above arrangement is now explained.

The driving force that has been transmitted from the engine to the clutch input shaft 17 via the transfer case of the transmission, the propeller shaft 13, the drive bevel gear 14, and the driven bevel gear 18 is transmitted to the right axle 19R by engaging the right hydraulic clutch 21R and is transmitted to the left axle 19L by engaging the left hydraulic clutch 21L.

When the right throttle valve 32R is narrowed in order to engage the right hydraulic clutch 21R, the hydraulic oil discharged by the right oil pump 29R is held back at the right throttle valve 32R, the oil pressure of the right clutch oil chamber 26R increases to thus press the clutch piston 25R, the friction plates 24R abut against each other, and the clutch inner 22R and the clutch outer 23R are joined. When the left throttle valve 32L is narrowed in order to engage the left hydraulic clutch 21L, the hydraulic oil discharged by the left oil pump 29L is held back at the left throttle valve 32L, the oil pressure of the left clutch oil chamber 26L increases to thus press the clutch piston 25L, the friction plates 24L abut against each other, and the clutch inner 22L and the clutch outer 23L are joined.

The hydraulic oil flowing from the hydraulic oil supply ports 35R and 35L of the right hydraulic clutch 21R or the left hydraulic clutch 21L into the clutch oil chambers 26R and 26L bifurcates and flows through the short oil grooves 33R and 33L and the long oil grooves 34R and 34L, fills the clutch oil chambers 26R and 26L, and is then discharged from the hydraulic oil discharge ports 36R and 36L. In this process, since the short oil grooves 33R and 33L and the long oil grooves 34R and 34L all have different lengths, the resistance acting on the hydraulic oil passing therethrough them is also different for all thereof, and the hydraulic oil is short-circuited along the shorter oil groove, thus making it impossible for the whole clutch pistons 25R and 25L to be pressed evenly; not only is there a possibility that smooth engagement of the left and right hydraulic clutches 21R and 21L will be inhibited, but there is also a possibility that variations in the engagement responsiveness of the left and right hydraulic clutches 21R and 21L will occur since the time taken for the clutch oil chambers 26R and 26L to be filled with hydraulic oil will differ due to the varying magnitude of the resistance.

However, in accordance with the present embodiment, when the hydraulic oil supply port 35R, 35L of each of the annular oil groove 33R, 33L, 34R, 34L is a Starting end and the hydraulic oil discharge port 36R, 36L of the annular oil groove is a finishing end, a cross-sectional area of the long oil groove 34R, 34L is set to be larger than a cross-sectional area of the short oil groove 33R, 33L, and the flow velocity of the hydraulic oil flowing through the short oil grooves 33R and 33L is made to coincide with the flow velocity of the hydraulic oil flowing through the long oil grooves 34R and 34L. Furthermore, of the cross-sectional areas of the shorter oil grooves 33R, 33L of the left and right hydraulic oil clutches 21R, 21L, the cross-sectional area of a longer one, that is, the oil groove 33L is set to be larger than that of a shorter one, that is, the oil groove 33R, so that the combined flow rate of the hydraulic oil of the short oil groove 33R and of the long oil groove 34R of the right hydraulic clutch 21R is set so as to be equal to the combined flow rate of the hydraulic oil of the short oil groove 33L and of the long oil groove 34L of the left hydraulic clutch 21L, thus making smooth operation possible by enabling the whole of the clutch pistons 25R and 25L of the left and right hydraulic clutches 21R and 21L to be pressed without bias and reducing pressure loss of the oil pressure and, moreover, making it possible to achieve improvement of the engagement responsiveness of the left and right hydraulic clutches 21R and 21L and make the engagement responsiveness uniform.

An embodiment of the present invention is explained above, but the present invention may be modified in a variety of ways as long as the modifications do not depart from the spirit and scope thereof.

For example, the phase differences between the hydraulic oil supply ports 35R and 35L and the hydraulic oil discharge ports 36R and 36L are not limited to those in the embodiment.

The invention claimed is:

1. A drive force distribution device for an automobile, comprising left and right hydraulic clutches for transmitting a driving force of a drive source to left and right axles, each of the left and right hydraulic clutches comprising:
   an annular oil groove opposing a clutch piston in an inner wall face of a clutch oil chamber; and
   a hydraulic oil supply port and a hydraulic oil discharge port communicating with the annular oil groove, wherein
   the annular oil groove comprises a short oil groove section and a long oil groove section,
   a first end of the short oil groove section is located adjacent the hydraulic oil supply port and a second end of the short oil groove section is located adjacent the hydraulic oil discharge port, and
   a cross-sectional area of the long oil groove section is larger than a cross-sectional area of the short oil groove section.

2. The drive force distribution device for an automobile according to claim 1, wherein
   a relative positional relationship of the hydraulic oil supply port and the hydraulic oil discharge port is different between the left and right hydraulic clutches, and, of the cross-sectional areas of the short oil groove section of each of the left and right hydraulic oil clutches, the cross-sectional area of a longer one of the shorter short oil groove sections is larger than the cross-sectional area of a shorter one of the short oil groove sections.

* * * * *